(12) United States Patent
Subramanian et al.

(10) Patent No.: US 9,692,031 B2
(45) Date of Patent: Jun. 27, 2017

(54) BUS BAR ASSEMBLY FOR ELECTRIFIED VEHICLE BATTERIES

(71) Applicant: FORD GLOBAL TECHNOLOGIES, LLC, Dearborn, MI (US)

(72) Inventors: Rajaram Subramanian, Ann Arbor, MI (US); Tom M. Gunther, Canton, MI (US); Francisco Fernandez, Canton, MI (US); Yunan Guo, Rochester Hills, MI (US); Stuart Schreiber, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 181 days.

(21) Appl. No.: 14/682,328

(22) Filed: Apr. 9, 2015

(65) Prior Publication Data

US 2016/0301057 A1 Oct. 13, 2016

(51) Int. Cl.
*H01M 2/20* (2006.01)
*H01M 10/48* (2006.01)
*B60L 11/18* (2006.01)

(52) U.S. Cl.
CPC ............. *H01M 2/206* (2013.01); *B60L 11/18* (2013.01); *H01M 10/482* (2013.01); *H01M 2220/20* (2013.01)

(58) Field of Classification Search
CPC ............... H01M 2/206; H01M 10/482; H01M 2220/20; H01B 13/0036
See application file for complete search history.

(56) References Cited

U.S. PATENT DOCUMENTS

| | | | |
|---|---|---|---|
| 7,198,524 B2 | 4/2007 | Tsugane et al. | |
| 8,114,540 B2 | 2/2012 | Trester et al. | |
| 8,409,744 B2 | 4/2013 | Ijaz et al. | |
| 2009/0274956 A1 | 11/2009 | Kosugi et al. | |
| 2012/0019061 A1* | 1/2012 | Nishihara | H01M 2/1077 307/10.1 |
| 2012/0212232 A1 | 8/2012 | Ikeda et al. | |
| 2012/0288743 A1 | 11/2012 | McLaughlin et al. | |
| 2014/0212724 A1 | 7/2014 | Lee et al. | |
| 2014/0335378 A1 | 11/2014 | Kuroda | |
| 2015/0072209 A1* | 3/2015 | Tyler | B60R 16/03 429/121 |
| 2016/0049703 A1* | 2/2016 | Lobert | H01M 10/625 429/62 |

* cited by examiner

*Primary Examiner* — Carlos Barcena
(74) *Attorney, Agent, or Firm* — Carlson, Gaskey & Olds (57) ABSTRACT

A bus bar assembly according to an exemplary aspect of the present disclosure includes, among other things, a plurality of battery cells and a bus bar assembly that electrically connects the plurality of battery cells. The bus bar assembly includes a flexible cable, a voltage sense lead connected to the flexible cable, and a bus bar connected to the voltage sense lead.

21 Claims, 6 Drawing Sheets

BUS BAR ASSEMBLY FOR ELECTRIFIED VEHICLE BATTERIES

TECHNICAL FIELD

This disclosure relates to a battery assembly for an electrified vehicle. Bus bar assemblies electrically connect a plurality of battery cells of the battery assembly. Each bus bar assembly includes a flexible cable, a voltage sense lead integrated with the flexible cable, and a bus bar connected to the voltage sense lead.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

Electrified vehicle powertrains are typically equipped with a battery assembly having a plurality of battery cells that store electric power for powering the electric machines and other electric loads of the electrified vehicle. The battery cells must be reliably connected to one another in order to achieve the voltage and power levels necessary for powering these electric loads. Separate bus bars, individual sense lead wires, plastic moldings, metal stampings, wire crimps, grommet moldings, and other parts are commonly used to sufficiently connect the battery cells.

SUMMARY

A bus bar assembly according to an exemplary aspect of the present disclosure includes, among other things, a plurality of battery cells and a bus bar assembly that electrically connects the plurality of battery cells. The bus bar assembly includes a flexible cable, a voltage sense lead connected to the flexible cable, and a bus bar connected to the voltage sense lead.

In a further non-limiting embodiment of the foregoing bus bar assembly, the bus bar is connected to a negative terminal of a first battery cell and a positive terminal of a second battery cell.

In a further non-limiting embodiment of either of the foregoing bus bar assemblies, the flexible cable includes an opening configured to expose the voltage sense lead for connection with the bus bar.

In a further non-limiting embodiment of any of the foregoing bus bar assemblies, the bus bar is welded to the voltage sense lead.

In a further non-limiting embodiment of any of the foregoing bus bar assemblies, a jumper wire connects between the voltage sense lead and the bus bar.

In a further non-limiting embodiment of any of the foregoing bus bar assemblies, the voltage sense lead is integrated with the flexible cable.

In a further non-limiting embodiment of any of the foregoing bus bar assemblies, the voltage sense lead is sandwiched between a first dielectric layer and a second dielectric layer of the flexible cable.

In a further non-limiting embodiment of any of the foregoing bus bar assemblies, the bus bar includes a body and a tab that protrudes from the body.

In a further non-limiting embodiment of any of the foregoing bus bar assemblies, the body is welded to terminals of two of the plurality of battery cells and the tab is welded to the voltage sense lead.

In a further non-limiting embodiment of any of the foregoing bus bar assemblies, the bus bar is integrated within the flexible cable.

A method according to an exemplary aspect of the present disclosure includes, among other things, providing a flexible cable, integrating a voltage sense lead to the flexible cable, and connecting a bus bar to the voltage sense lead to assembly a bus bar assembly.

In a further non-limiting embodiment of the foregoing method, the method includes electrically connecting a plurality of battery cells of a battery assembly using the bus bar assembly.

In a further non-limiting embodiment of either of the foregoing methods, the connecting step occurs before the integrating step.

In a further non-limiting embodiment of any of the foregoing methods, the connecting step occurs after the integrating step.

In a further non-limiting embodiment of any of the foregoing methods, the connecting step includes welding a jumper wire to the voltage sense lead and the bus bar.

In a further non-limiting embodiment of any of the foregoing methods, the connecting step includes laser welding the bus bar to the voltage sense lead.

In a further non-limiting embodiment of any of the foregoing methods, the integrating step includes imbedding the voltage sense lead within the flexible cable.

In a further non-limiting embodiment of any of the foregoing methods, the integrating step includes sandwiching the voltage sense lead between a first dielectric layer and a second dielectric layer of the flexible cable.

In a further non-limiting embodiment of any of the foregoing methods, the method includes feeding a strip of material into the flexible cable and forming notches in the strip of material to form the bus bar.

In a further non-limiting embodiment of any of the foregoing methods, the feeding step includes feeding the strip of material between a first layer and a second layer of the flexible cable.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may employ a bus bar assembly for electrically connecting a plurality of battery cells of the battery assembly. The bus bar assembly may include a flexible cable, a voltage sense lead embedded within the flexible cable, and a bus bar connected to the voltage sense lead. The bus bar assemblies of this disclosure accommodate variations between cell terminal heights of adjacent battery cells and enable a simplified assembly process for constructing the battery assembly. These and other features are discussed in greater detail in the following paragraphs of this detailed description.

Figure 1:
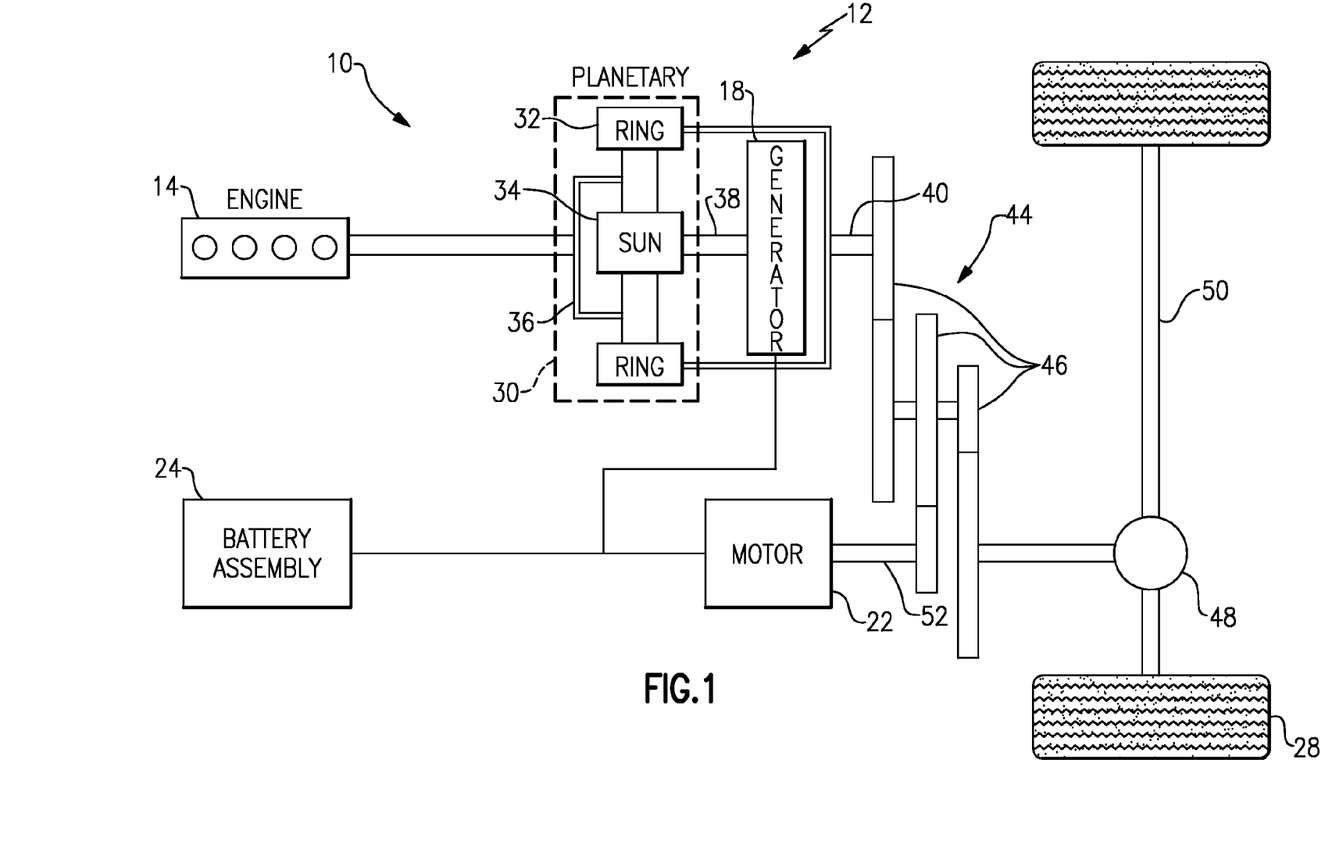
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery cells capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
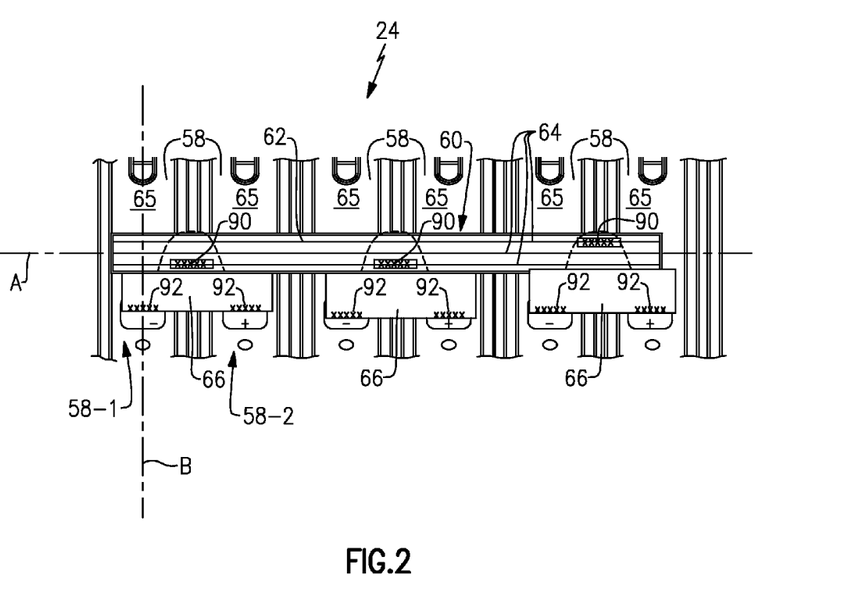
FIG. 2 illustrates a battery assembly of an electrified vehicle.

FIG. 2 illustrates a battery assembly 24 that can be incorporated into an electrified vehicle. For example, the battery assembly 24 could be employed within the electrified vehicle 12 of FIG. 1. The battery assembly 24 includes a plurality of battery cells 58 for supplying electrical power to various components of the electrified vehicle 12. Although a specific number of battery cells 58 are illustrated in FIG. 2, the battery assembly 24 could include a greater or fewer number of battery cells within the scope of this disclosure. In other words, this disclosure is not limited to the specific configuration shown in FIG. 2.

The battery cells 58 may be stacked side-by-side to construct a grouping of battery cells, sometimes referred to as a battery array. In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

Each battery cell 58 includes a positive terminal (designated by the symbol (+)) and a negative terminal (designed by the symbol (−)). However, only one terminal of each battery cell 58 is shown in FIG. 2. The battery cells 58 are arranged such that each battery cell 58 terminal is disposed adjacent to a terminal of an adjacent battery cell 58 having an opposite polarity. For example, in one non-limiting embodiment, the negative terminal (−) of a first battery cell 58-1 is positioned adjacent to a positive terminal (+) of a second battery cell 58-2. This alternating pattern continues across the entire span of the grouping of battery cells 58.

The battery assembly 24 may include one or more bus bar assemblies 60. The bus bar assemblies 60 electrically connect the battery cells 58 relative to one another. In one non-limiting embodiment, the bus bar assembly 60 extends across a top surface 65 of each battery cell 58 along an axis A that is generally perpendicular to an axis B of each battery cell 58.

The exemplary bus bar assembly 60 may include a flexible cable 62, one or more voltage sense leads 64, and one or more bus bars 66. In the illustrated embodiment, the bus bar assembly 60 includes a plurality of voltage sense leads 64 and a plurality of bus bars 66. However, this disclose is not limited to the exact configuration shown. It should be understood that the bus bar assembly 60 could include any configuration having one or more voltage sense leads and one or more bus bars.

In use, the bus bar assembly 60 provides an integrated circuit for electrically connecting the battery cells 58 such that electrical power may be distributed throughout the electrified vehicle. High voltage current from each battery cell 58 is conducted through the bus bars 66. The voltage of each battery cell 58 may be measured by the voltage sense leads 64, which communicate voltage signals to another component, such as a control module (not shown) of the battery assembly 24.

In one embodiment, the flexible cable 62 is made of a pliable (i.e., bendable) material. Various plastic materials may be suitable for constructing the flexible cable 62. Non-limiting examples of suitable plastic materials include polyester (PET), polyimide (PI), polyethylene napthalate (PEN), polyethermide (PEI), and various fluropolymers (FEP) and/or copolymers. In another embodiment, the flexible cable 62 is made of Kapton®, which is available from DuPont.

Figure 7:
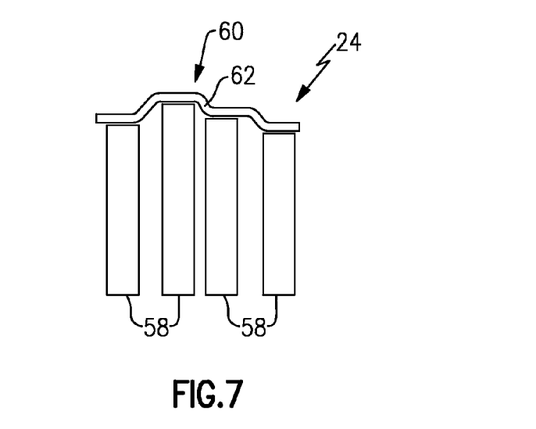
FIG. 7 illustrates a battery assembly exhibiting cell height variations between adjacent battery cells.

Because of the pliable nature of the flexible cable 62, the bus bar assembly 60 is configured to accommodate any cell height variations between the battery cells 58 of the battery assembly 24 (see, for example, FIG. 7). Cell height variations can occur during assembly of the battery assembly 24.

Each voltage sense lead 64 may be integrated with the flexible cable 62. In this disclosure, the term "integrated" means the voltage sense leads 64 are fabricated directly on or imbedded within the flexible cable 62. In one embodiment, the voltage sense leads 64 include copper traces or wires that are printed onto the flexible cable 62. The voltage sense leads 64 may be applied onto or into the flexible cable 62 using a variety of additive or subtractive techniques. Non-limiting examples of such techniques include printing, plating, etching, laminating, engraving, milling, ablation, etc.

Figure 3A:
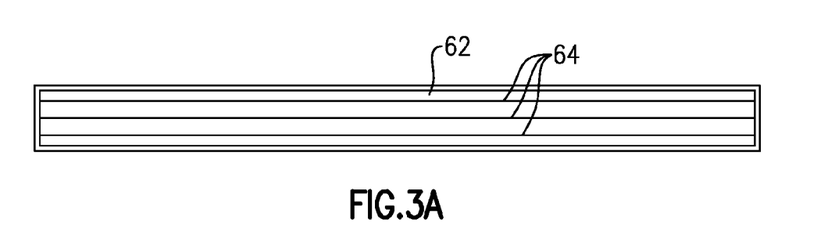
FIGS. 3A, 3B, 3C and 3D schematically illustrate a method of assembling a bus bar assembly according to a first embodiment of this disclosure.
Figure 3B:
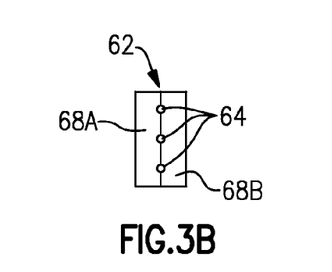

In another embodiment, the voltage sense leads 64 are sandwiched between a first dielectric layer 68A and a second dielectric layer 68B of the flexible cable 62 (see FIG. 3B). The first dielectric layer 68A and a second dielectric layer 68B may be sealed together to prevent moisture from wicking into the voltage sense leads 64. The flexible cable 62 could also include additional layers.

In one embodiment, the bus bars 66 are stamped, relatively thin strips of metal that are configured to conduct power generated by the battery cells 58. In one non-limiting embodiment, the bus bars 66 are made of aluminum. In another embodiment, the bus bars 66 are bimetallic members that can be made of multiple materials, such as copper and aluminum. Other materials having conductive properties may also be suitable.

As discussed in greater detail below, each bus bar 66 may be welded to one of the voltage sense leads 64 and may be welded to the terminals of two adjacent battery cells 58 to connect the bus bar assembly 60 to the plurality of battery cells 58. For example, as depicted in FIG. 2, a first weld bead 90 may be used to attach the bus bars 66 to the voltage sense leads 64 and a second weld bead 92 may be used to attach the bus bars 66 to the battery cell 58 terminals.

FIGS. 3A, 3B, 3C and 3D schematically illustrate a method of assembling the bus bar assembly 60. Referring first to FIG. 3A, a flexible cable 62 of a desired size and shape is provided and includes a plurality of integrated voltage sense leads 64. The voltage sense leads 64 may be integrated within the flexible cable 62, such as by printing the voltage sense leads 64 onto the flexible cable 62 or by sandwiching the voltage sense leads 64 between a first dielectric layer 68A and a second dielectric layer 68B of the flexible cable 62 (see FIG. 3B).

Figure 3C:
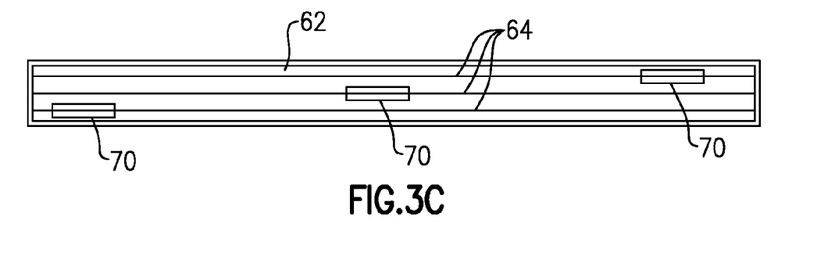

As shown in FIG. 3C, openings 70 may next be formed in the flexible cable 62. In one non-limiting embodiment, the openings 70 are cut-outs formed in the flexible cable 62, such as through a top layer of the flexible cable 62, a bottom layer, or both. The openings 70 expose portions of each voltage sense lead 64.

Figure 3D:
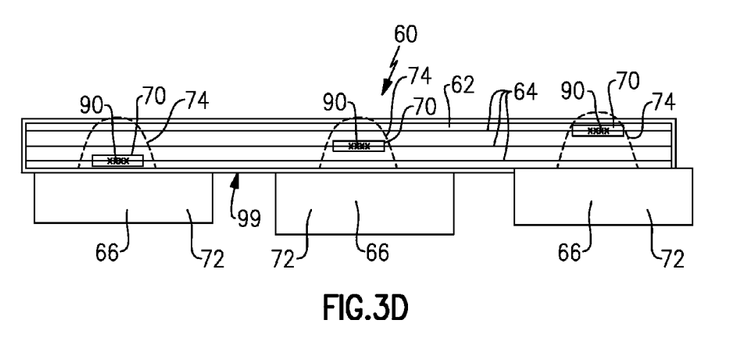

FIG. 3D illustrates connection of the bus bars 66 to the voltage sense leads 64. In one embodiment, one bus bar 66 may be welded to one voltage sense lead 64 at the portions of the voltage sense leads 64 that are exposed at the openings 70. In another non-limiting embodiment, the bus bars 66 are laser welded to the voltage sense leads 64. Once the bus bars 66 are welded to the voltage sense leads 64 via one or more weld beads 90, the bus bar assembly 60 is fully assembled and ready for attachment to a plurality of battery cells 58 of a battery assembly 24 (see, for example, FIG. 2).

Figure 4:
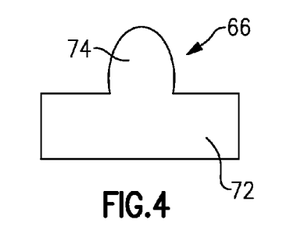
FIG. 4 illustrates a bus bar.

FIG. 4 illustrates an exemplary bus bar 66 that may be utilized within the bus bar assembly 60 described above. The bus bar 66 includes a body 72 and a tab 74 that protrudes from the body 72. The tab 74 may extend over top of the flexible cable 62, underneath the flexible cable 62, or between layers of the flexible cable 62 and is configured for attachment to one of the voltage sense leads 64 (see FIG. 3D). In one embodiment, the body 72 of the bus bar 66 is contiguous with an edge 99 of the flexible cable 62 but does not overlap with the edge 99 (see FIG. 3D).

Figure 5A:
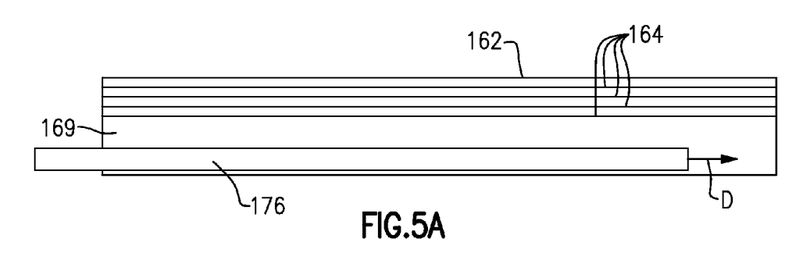
FIGS. 5A, 5B, 5C and 5D schematically illustrate a method of assembling a bus bar assembly according to another embodiment of this disclosure.
Figure 5B:
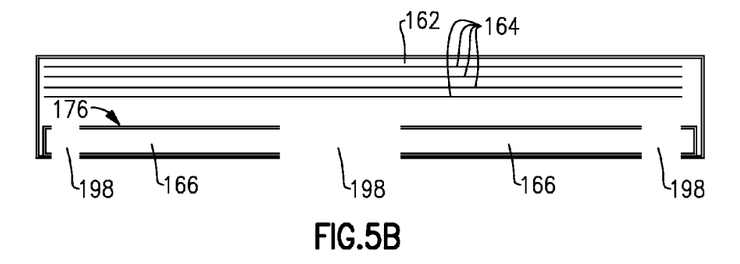
Figure 5C:
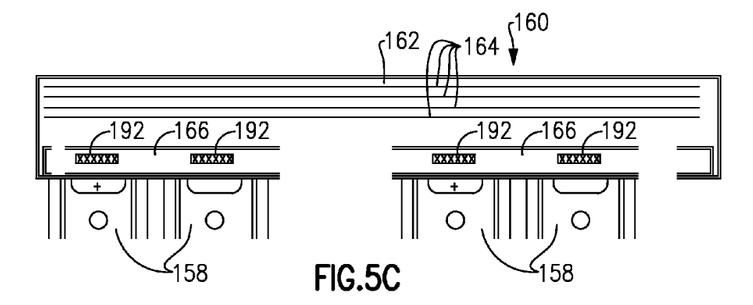

FIGS. 5A, 5B and 5C schematically illustrate a method of constructing a bus bar assembly 160. In this disclosure, like reference numbers designate like elements where appropriate and reference numerals with the addition of 100 or multiples thereof designate modified elements that are understood to incorporate the same features and benefits of the corresponding original elements.

Figure 5D:
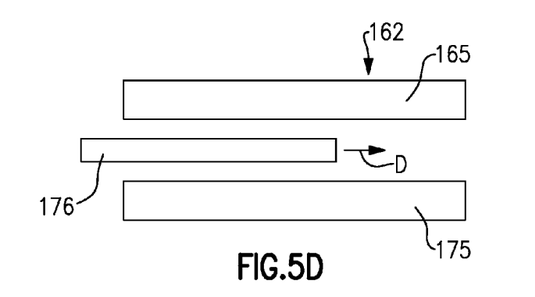

In this exemplary embodiment, a flexible cable 162 is provided having a plurality of voltage sense leads 164 embedded within the flexible cable 162. As illustrated in FIG. 5A, a strip of material 176 may be fed into the flexible cable 162 by moving the strip of material 176 in a direction D that is substantially parallel to the longitudinal axis of the flexible cable 162. For example, the strip of material 176 may be fed onto an outer surface 169 of the flexible cable 162 (see FIG. 5A) or could be fed between layers 165, 175 of the flexible cable 162 (see FIG. 5D). The strip of material 176 may be electrically connected to the voltage sense leads 164 either before or after the strip of material 176 has been fed into the flexible cable 162. In other words, the voltage sense leads 164 and the strip of material 176 may be integrated with the flexible cable 162 either together or separately.

Referring to FIG. 5B, the strip of material 176 may then be notched to form a plurality of bus bars 166. The strip of material 176 may be cut in any known manner to create notches 198 that extend between the bus bars 166. The notches 198 electrically isolate the bus bars 166 from one another.

Finally, as shown in FIG. 5C, the bus bars 166 may be welded to attach the bus bar assembly 160 to the terminals of the battery cells 158. In one non-limiting embodiment, the bus bars 166 are laser welded to the terminal of the battery cells 158. The welding process creates a weld bead 192 to fixedly secure the bus bars 166 to the terminals of the battery cell 158.

Figure 6:
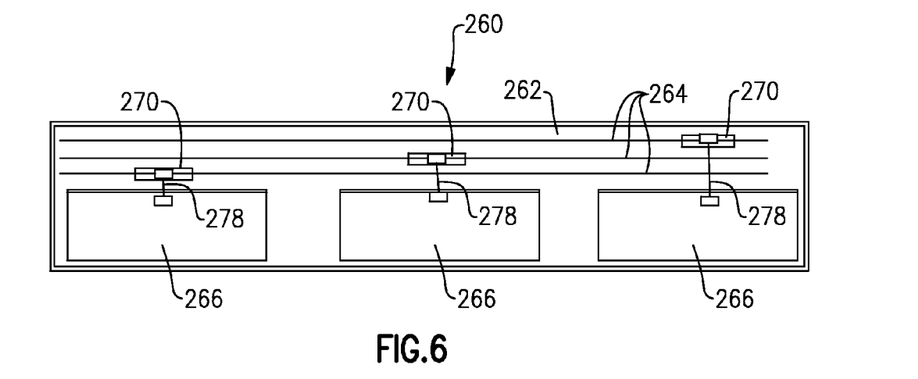
FIG. 6 illustrates a bus bar assembly.

FIG. 6 illustrates another bus bar assembly 260. The bus bar assembly 260 includes a flexible cable 262, a plurality of voltage sense leads 264 and a plurality of bus bars 266. Each voltage sense lead 264 may be integrated with the flexible cable 262. Each bus bar 266 may be electrically connected to one of the voltage sense leads 264 and may be welded to the terminals of two adjacent battery cells (not shown in FIG. 6) to connect the bus bar assembly 260 to the plurality of battery cells. In one embodiment, jumper wires 278 may extend between the voltage sense leads 264 and the bus bars 266 to electrically connect these components. The jumper wires 278 may be welded to both the voltage sense leads 264 and the bus bars 266.

The bus bars 266 may be electrically connected to the voltage sense leads 264 either before or after integration with the flexible cable 262. If before, the bus bars 266 and voltage sense leads 264 may be fed together into the flexible cable 262. If after, the bus bars 266 and the voltage sense leads 264 may be integrated into the flexible cable separately. Openings 270 may optionally be formed in the flexible cable 262 to expose the voltage sense leads 264 for enabling connection of the jumper wires 278 to the voltage sense leads 264.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a plurality of battery cells;
a bus bar assembly that electrically connects said plurality of battery cells, said bus bar assembly comprising:
a flexible cable;
a voltage sense lead connected to said flexible cable, wherein a portion of said voltage sense lead is exposed through a cut-out of said flexible cable; and
a bus bar connected to said voltage sense lead.

2. The battery assembly as recited in claim 1, wherein said bus bar is connected to a negative terminal of a first battery cell and a positive terminal of a second battery cell.

3. The battery assembly as recited in claim 1, wherein said bus bar is welded to said voltage sense lead.

4. The battery assembly as recited in claim 1, comprising a jumper wire that connects between said voltage sense lead and said bus bar.

5. The battery assembly as recited in claim 1, wherein said voltage sense lead is integrated with said flexible cable.

6. The battery assembly as recited in claim 1, wherein said voltage sense lead is sandwiched between a first dielectric layer and a second dielectric layer of said flexible cable.

7. The battery assembly as recited in claim 1, wherein said bus bar includes a body and a tab that protrudes from said body.

8. The battery assembly as recited in claim 7, wherein said body is welded to terminals of two of said plurality of battery cells and said tab is welded to said voltage sense lead.

9. The battery assembly as recited in claim 1, wherein said bus bar is integrated within said flexible cable.

10. The battery assembly as recited in claim 1, wherein said bus bar is connected to said portion of said voltage sense lead that is exposed through said cut-out of said flexible cable.

11. A method, comprising:
providing a flexible cable;
integrating a voltage sense lead within the flexible cable, wherein at least a portion of the voltage sense lead is exposed through a cut-out formed in the flexible cable; and
connecting a bus bar to the voltage sense lead to assemble a bus bar assembly.

12. The method as recited in claim 11, comprising electrically connecting a plurality of battery cells of a battery assembly using the bus bar assembly.

13. The method as recited in claim 11, wherein the connecting step occurs before the integrating step.

14. The method as recited in claim 11, wherein the connecting step occurs after the integrating step.

15. The method as recited in claim 11, wherein the connecting step includes welding a jumper wire to the voltage sense lead and the bus bar.

16. The method as recited in claim 11, wherein the connecting step includes laser welding the bus bar to the voltage sense lead.

17. The method as recited in claim 11, wherein the integrating step includes imbedding the voltage sense lead within the flexible cable.

18. The method as recited in claim 11, wherein the integrating step includes sandwiching the voltage sense lead between a first dielectric layer and a second dielectric layer of the flexible cable.

19. The method as recited in claim 11, wherein the connecting step includes connecting the bus bar to the portion of the voltage sense lead that is exposed through the cut-out of the flexible cable.

20. A method, comprising:
 providing a flexible cable;
 integrating a voltage sense lead to the flexible cable;
 feeding a strip of material into the flexible cable;
 forming notches in the strip of material to form a bus bar; and
 connecting the bus bar to the voltage sense lead to assemble a bus bar assembly.

21. The method as recited in claim 20, wherein the feeding step includes feeding the strip of material between a first layer and a second layer of the flexible cable.

* * * * *